United States Patent

Ishii et al.

[11] 4,125,860
[45] Nov. 14, 1978

[54] REPRODUCER FOR AN ERASEABLE VIDEODISC

[75] Inventors: Akira Ishii, Kawasaki; Fumio Kishino, Tokorozawa; Kingo Yamagishi, Kokubunji, all of Japan

[73] Assignee: Nippon Telegraph and Telephone Public Corporation, Tokyo, Japan

[21] Appl. No.: 693,778

[22] Filed: Jun. 8, 1976

[30] Foreign Application Priority Data

Jun. 16, 1975 [JP] Japan .................................. 50-72856
Oct. 22, 1975 [JP] Japan ................................ 50-127032

[51] Int. Cl.$^2$ ............................................. H04N 5/76
[52] U.S. Cl. ............................ 358/128; 179/100.3 G; 179/100.3 V; 350/162 SF; 350/173; 250/570; 365/124
[58] Field of Search ................ 179/100.3 G, 100.3 V, 179/100.41 L; 360/56, 59; 358/127, 128; 340/173 LM, 173 LT; 350/162 SF, 173; 250/550, 570; 365/113, 121, 122, 124, 207, 215

[56] References Cited

U.S. PATENT DOCUMENTS

| | | | |
|---|---|---|---|
| T953,002 | 12/1976 | Firester | 179/100.3 G |
| 1,765,882 | 6/1930 | Romer | 350/173 |
| 3,534,166 | 10/1970 | Korpel | 179/100.3 G |
| 3,623,024 | 11/1971 | Hamilton | 365/124 |
| 3,629,517 | 12/1971 | Grimm | 358/127 |
| 3,696,344 | 10/1972 | Feinleib | 340/173 LM |
| 3,731,290 | 5/1973 | Aagard | 360/59 |
| 3,876,842 | 4/1975 | Bouwhuis | 179/100.3 G |
| 3,904,835 | 9/1975 | Matsumoto | 179/100.3 G |
| 3,909,608 | 9/1975 | LeMerer | 179/100.3 G |
| 3,919,562 | 11/1975 | Whitman | 179/100.3 G |
| 3,969,576 | 7/1976 | Boonstra | 179/100.3 V |
| 3,971,002 | 7/1976 | Bricot | 179/100.3 G |

OTHER PUBLICATIONS

"Amorphous-Semiconductor Switching," by H. K. Henisch, Scientific American, Nov., 1969, vol. 221, No. 5, pp. 30-41.

Primary Examiner—Alfred H. Eddleman
Assistant Examiner—Alan Faber
Attorney, Agent, or Firm—Flynn & Frishauf

[57] ABSTRACT

An apparatus optically reproduces FM electric signals from the recording medium recorded with said electric signals in the form of a change in refraction index. The apparatus is so constructed that a pair of laser beams are incident on the recording medium at substantially the same point with an angle defined between the laser beams; a diffracted light obtained by causing each of said beams to be diffracted, upon being transmitted through the recording medium, in accordance with the phase change pattern thereof is overlapped on a non-diffracted light obtained by causing the each of said beams to be transmitted through the recording medium without being diffracted; and optically phase-modulated signals are detected as a beat output produced by optical mixing of the diffracted light with the non-diffracted light, thus to reproduce a recorded signal.

14 Claims, 15 Drawing Figures

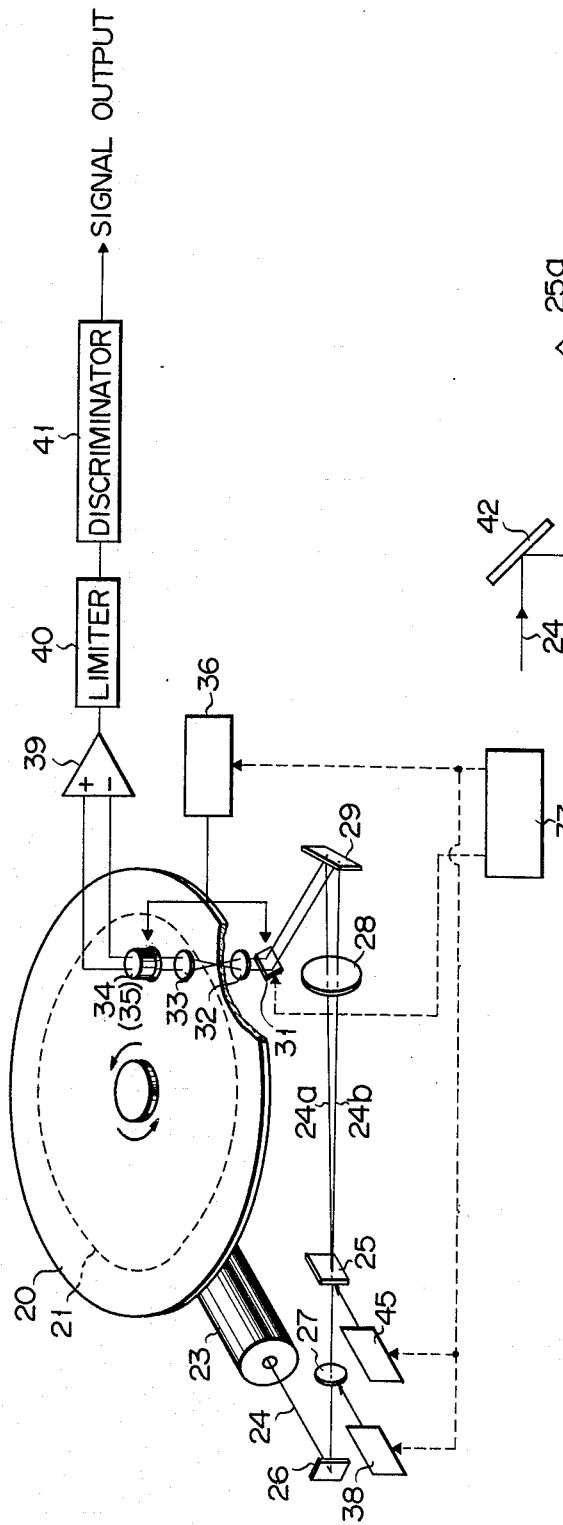
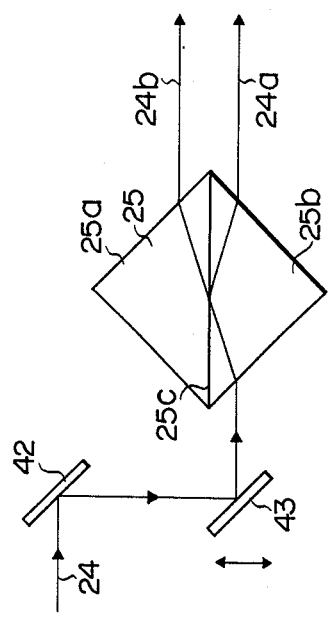

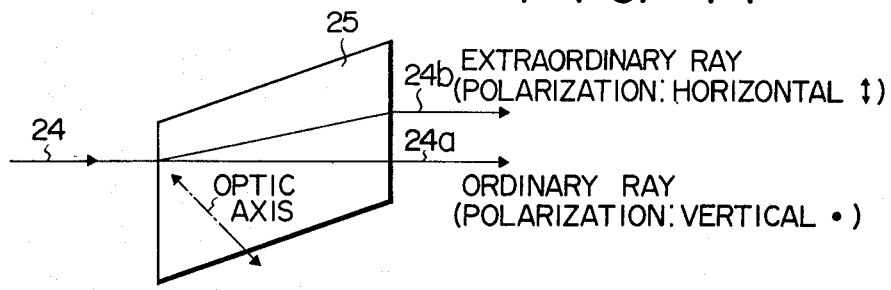
FIG. 11
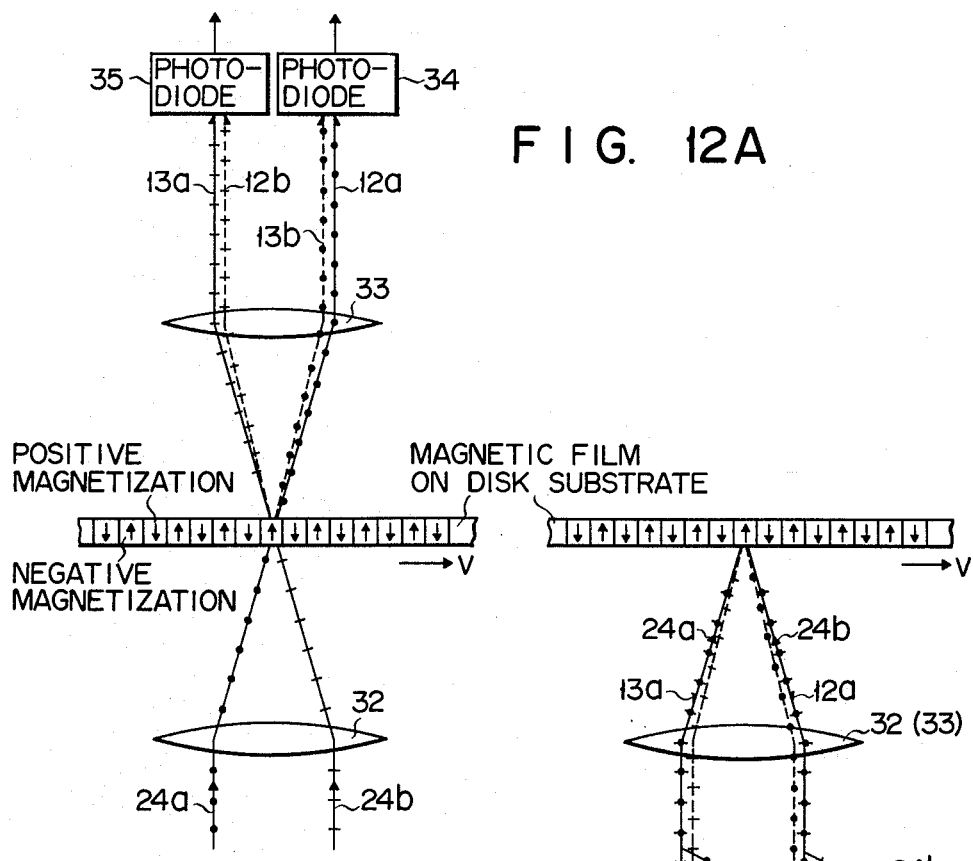
FIG. 12A
FIG. 12B

REPRODUCER FOR AN ERASEABLE VIDEODISC

This invention relates to an apparatus for optically reproducing an electric signal such as a television signal, a facsimile signal or an audio signal from a moving medium on which said electric signal is recorded by way of laser recording, electron beam recording or magnetic recording, and more particularly to an apparatus for reproducing an electric signal recorded in a state modulated by the method of carrier modulation such as frequency modulation, phase modulation or pulse phase modulation, through detecting by laser beams the optical phase variation due to the change in refraction index, the change in magnetization direction, or the irregularity of a surface, of the recording medium.

A laser beam recording technique would enable an electric signal to be recorded with high density in a recording medium, and therefore has come to be accepted in various fields. As a system for recording television signals there have been reported, for example, a Philips Video Long-Play System (Journal of the Society of Motion Picture and Television Engineers, vo. 83, No. 7, pp. 564–579, July 1974), an MCA Disco-Vision System (ibid., pp. 554–559), etc. These Systems are each so designed that an electric signal is recorded in a disc like recording medium made of a polyvinyl chloride plate or a Mylar sheet by using the engravings or pits of the surface of that medium; and upon reproduction of said electric signal a single laser beam (Strictly additional two laser beams are used to perform the track following) is irradiated onto a signal recording track of the rotating disc like recording medium; and the laser beam reflected and scattered from the surface of the recording medium is detected by a photodiode and converted for reproduction into an electric signal in accordance with the intensity of the laser light. The abovementioned conventional recording and playback techniques indeed have the effect of permitting a mass-production of television signal recording discs from a master disc by using the polyvinyl chloride plates or Mylar sheets as replica materials, but are only narrowly applicable and can not be applied to other recording and reproducing systems such as that in which rewriting operation is required.

As a recording medium material capable of being subject to rewriting a chalcogenide glass, especially an As-Se-Ge chalcogenide glass or an As-Se-S-Ge chalcogenide glass, has been proposed (Journal of Non-Crystalline Solids, volume 11, No. 4, p. 304–308, January 1973, T. Igo and Y. Toyoshima, "A Reversible Optical Change in the As-Se-Ge Glass;" Proceedings of the 5th Conference (1973 International) on Solid State Devices, Tokyo, Japan, 1973, Supplement to the Journal of the Japan Society of Applied Physics, Volume 43, pp. 106–111, 1974, T. Igo and Y. Toyoshima, "Some Aspects of the Reversible Optical Effects in (Se, S) Based Chalcogenide Glasses"). The above-mentioned chalcogenide glass, upon being subject to irradiation of a light having a relatively short wavelength (about 5000 Å) such as an argon ion laser light, permits the recording of a change pattern in refraction index proportional to the intensity of that light, so that the laser light subject to intensity modulation by an electric signal can be recorded in the glass in the form of a change in refraction index. Since, however, this change in refraction index is not wide to such an extent as to permit a strong scattering of the laser light as in the case of engravings or pits of the medium surface, the use of the conventional recording and playback technique as it stands did not enable a sufficient achievement of the desired purpose.

As another recording medium capable of being subject to rewriting there has been proposed a magnetic film such as a Mn-Bi film or Gd-Co film. In this magnetic film, owing to its being heated by the laser light, the direction of magnetization can be selectively inverted only at the heated portion by controlling the external field. Further, through being continuously irradiated by the laser light subject to intensity modulation by electric signals, the magnetic film permits the recording of these electric signals in accordance with the extent to which the direction of film magnetization is inverted. The magnetization inversion pattern of the signal thus prepared provides the effect of permitting the plane of polarization of the transmitted or reflected laser light to be rotated with respect to that of the incident laser light through an angle proportional to the extent to which the magnetization direction is inverted (Faraday effect or Kerr effect). This can be regarded as a kind of "phase control of light" effect (Journal of Applied Physics, Volume 40, No. 3, pp. 974–975, 1st Mar., 1969, G. Fan. K. Pennington, and J. H. Greiner, "Magneto-Optic Hologram"). As stated above, however, the phase change occurring due to the action of the magnetic film is small, and therefore the laser beam could not be subject to strong scattering.

As mentioned above, difficulties are encountered in applying the chalcogenide glass to the conventional recording and playback technique by using the glass as a recording medium since the detected signal is small. Further, even if the glass is forcibly used, it would lead, for the same reason, to the necessity of a huge laser light source for obtaining a large output, so that the apparatus as a whole becomes bulky and expensive.

Accordingly, the object of the invention is to provide an apparatus permitting the use of a recording medium capable of being subject to rewriting such as a chalcogenide glass or magnetic film, without being accompanied by an increase in size and cost of the apparatus as a whole, namely an apparatus capable of reproducing with high efficiency an electric signal from a moving recording medium on which this electric signal is recorded by utilizing a narrow range of phase change.

SUMMARY OF THE INVENTION

The apparatus for reproducing an electric signal recorded in a moving recording medium by way of carrier modulation according to an embodiment of the invention comprises a laser light source for emitting a laser beam, a means for dividing the laser beam into a pair of laser beams, a member for condensing the laser beam pair onto the recording medium, and means for receiving mutually overlapping diffracted light and non-diffracted light produced by diffraction of the laser beam pair due to the action of the recording medium to produce a beat signal having a difference frequency between the diffracted light and the non-diffracted light, thereby reproducing from this beat signal a modulated signal recorded in the recording medium.

According to the apparatus of the invention, even if the recording medium indicates a narrow range of phase change and therefore provides a low diffracted light intensity, a large signal output can be obtained by optical mixing of this diffracted light with a non-diffracted light having high intensity. Further, although, in the conventional system, the laser beam diameter had to be sufficiently small with respect to the recording wavelength of the carrier, in the present apparatus the laser beam may be of the diameter almost equal to the recording wavelength, so that the depth of focus at the time of signal reading can be increased by that extent. The present apparatus, therefore, has the advantages of permitting an alleviation of the mechanical precision with which a focus adjusting mechanism of the optical system is constructed and of making it easy to subject a signal recording track to high speed random access by means of an optical readout head.

The technique for effecting, as in the case of the present apparatus, signal reproduction by optical mixing of a pair of laser beams is described in U.S. Pat. No. 3,623,024 and British Pat. No. 1,335,540. But, these conventional techniques each use as a recording medium a usual photographic film which permits the recording of audio signals subject to phase modulation or frequency modulation in the form of a change in transmittivity as expressed in terms of black-and-white chromaticity, and is intended to reproduce audio signals having an extremely narrow frequency band as compared with video signals. Therefore, such conventional techniques give no particular consideration to the take-out with high efficiency of signals from a diffracted light to improve the S/N ratio of a reproduced output, but are designed to increase the depth of focus of a laser beam by making possible the signal reproduction by the laser beam large in diameter, and are thus intended to alleviate the mechanical precision of the apparatus. Further, in any one of such conventional techniques, an extremely narrow slit is required to be provided at the front face of a lgiht receiving element, and on that account the laser light incident into the light receiving element and contributing to production of signal reproduction output is an extremely small part of the readout laser light, resulting in a remarkably large loss of the laser light. Accordingly, in the case of reproducing signals having a wideband frequency such as video signals, neither a sufficiently high signal output level nor a sufficiently high signal-to-noise ratio is obtained with a small-sized laser light source capable of only providing a small output. Practically, therefore, a large-sized laser light source capable of providing a large output is required. Further, in the above-mentioned conventional techniques, an optical system for guiding a reference light being mixed with a diffracted light becomes complicated and yet an optical system for causing the diffracted light to overlap on the reference light also becomes complicated. Therefore, application of said conventional technique to a Video Disc System for subjecting an optical readout head to access to signal recording tracks recorded concentrically or spirally in a rotating disc type moving recording medium as one of important applications of the invention, thereby reproducing television signals cause an increase in size of the optical readout head, which provides an inconvenience in putting to practical use especially a rapid still picture retrieval system designed to record a one-frame still picture in each signal recording track and subject the head to high speed random access to the track. Since the above-mentioned conventional technique is so designed as to permit a tape-like recording medium to travel through a fixed signal readout optical system thereby reproducing audio signals having a much narrower frequency band than television signals, the above-mentioned various drawbacks do not always pose a problem. For achieving the object of the invention, however, such drawbacks pose extremely great inconveniences.

BRIEF DESCRIPTION OF THE DRAWINGS

FIG. 9 is a top view showing a beam splitting and beam-to-beam interval adjusting means of the apparatus shown in FIG. 8;

FIG. 10 schematically shows the optical reproduction apparatus according to still another embodiment of the invention;

FIG. 11 is a view for explaining the function or action of a calcite usable when the technique of the invention is applied to the signal reproduction from a magnetic recording medium;

FIGS. 12A and 12B are intended to explain optical systems for reproducing signals from the magnetic recording medium by the use of a transmission system and a reflection system, respectively.

DETAILED DESCRIPTION

Explanation will be made of the case where electric signal is reproduced, by a reproducing apparatus according to this invention, from a disc-like rotary recording medium in which an electric signal is recorded as a phase change.

Figure 1:
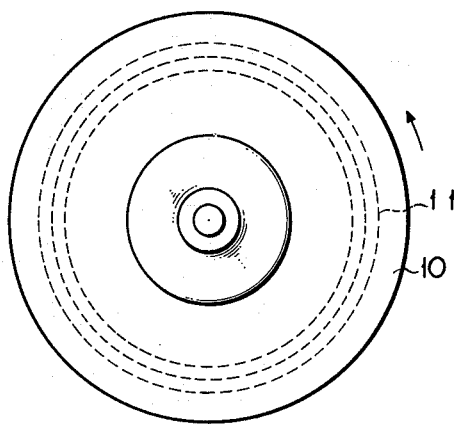
FIG. 1 is a plan view showing a disc-like recording medium.

As will be shown in FIG. 1 a recording medium 10 has concentric (or spiral) signal recording tracks 11. The recording medium 10 has a photosensitive recording material deposited on a transparent glass substrate and electric signal is recorded by a known technique on the signal track on the recording medium. The signal track 11 is responsive, upon receipt of an incident laser beam, to the frequency spectrum of the signal and serves as a complicated diffraction grating having various pitches to permit the incident laser beam to be diffracted.

In a reproducing apparatus according to this invention two lines of laser beams 12, 13 are incident on the recording medium 10 so that they cross at a predetermined angle on the track 11 of the recording medium to permit a diffraction light of each laser beam through the recording medium 10 to be superposed on a zero order light of the other laser beam through the recording medium 10. The two superposed lights are detected, through an objective lens 14, at two light receiving elements, for example, photodiodes 15, 16. The diffracted lights are subjected to the Doppler shift of a light frequency corresponding to the frequency spectrum of a recording signal through the laser beam incident position on the track 11 of the recording medium (The light Doppler's phenomenon is disclosed in J. I. Pankove "optical processes in semiconductors" Prentice-Hall, Inc. New York 1971, page 276). When a mixing of the diffracted light and the zero order light is effected at the photodiodes, it is possible to obtain a beat output corresponding to the frequency component of the recording signal. The beat output provides the reproducing output of the recording signal. The outputs of the two photodiodes are differentially amplified and a reproducing signal is obtained after spurious components are eliminated.

The reproducing process as mentioned above will be theoretically explained below.

A frequency modulated (FM) signal will be explained as a recording signal, but the same result will be obtained if a phase modulated (PM) signal, pulse phase modulated (PPM) signal, pulse width modulated (PWM) signal etc. are used as such. The dependency of optical quantities on the vertical distances from the track, as well as a constant term and constant multiplier of no importance, will be omitted for the sake of brevity since they are not essential for explaining the reproducing process.

An FM signal $\phi(t)$ will be expressed as follows (H. S. Black, "Modulation Theory," D. Van Nostrand Company, Inc. New York, 1966, page 191):

$$\left.\begin{array}{l}\phi(t) = \cos\{\omega_c t + \Delta\omega \int^t s(t)\,dt\} \\ \text{or} \\ \phi(t) = \cos\{\omega_c t + \Delta\omega S(t)\}\end{array}\right\} \quad (1)$$

where
$s(t)$ : signal
$t$ : time
$S(t)$ : $\int^t s(t)\,dt$
$\omega_c$ : carrier angular frequency
$\Delta\omega$ : constant representative of the magnitude of the deviation of an angular frequency.

Where the FM signal $\phi(t)$ is recorded on the disc medium in which a signal is recorded as the phase change, the amplitude transmittance distribution $\Phi(x)$ of the signal recording track in the laser beam incident position will be given below:

$$\Phi(x) = e^{iK\phi(-x/v)} \quad (2)$$

where
$x$: coordinate axis having an origin at the laser beam incident position and defined in a direction tangential to the track
$v$: tangential speed of the track during the signal recording time
$K$: constant Where the phase change is smaller, i.e., $|K\phi(-x/v)| << 1$, the following approximation will be obtained.

$$\Phi(x) \approx 1 + iK\phi(-x/v) \quad (3)$$

During the signal reproducing time the amplitude transmittance distribution $\Phi(x-vt)$ in the laser beam incident position will be expressed as follows:

$$\Phi(x-vt) \approx 1 + iK\phi(t-x/v) \quad (4)$$

Substituting the expression (1) in the equation (4) yeilds $$\Phi(x-vt) \approx 1 + iK\cos\{-k_c x + \omega_c t + \Delta\omega S(t - \frac{x}{v})\} = 1 + \quad (5)$$

$$\frac{iK}{2} e^{-ik_c x} e^{i\omega_c t} e^{i\Delta\omega S(t - \frac{x}{v})} + \frac{iK}{2} e^{ik_c x} \cdot e^{-i\omega_c t} e^{-i\Delta\omega S(t - \frac{x}{v})}$$

provided that $k_c = \omega_c/v$.

Figure 3:
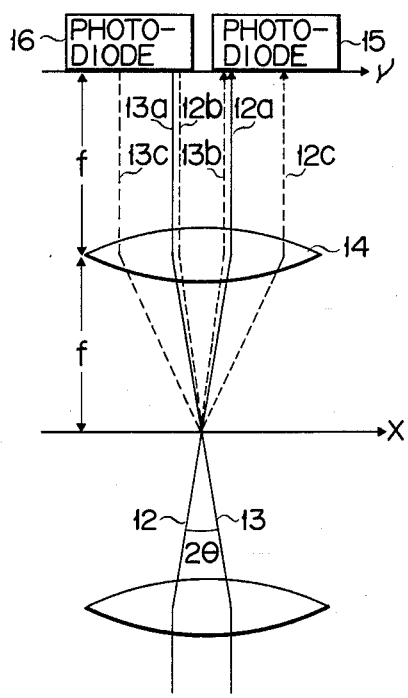
FIGS. 2, 2A and 3 are each a schematic view of an optical system for explaining a reproducing system according to the invention.
Figure 2A:
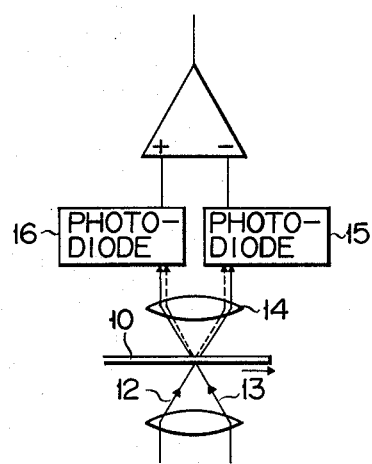
Figure 2:
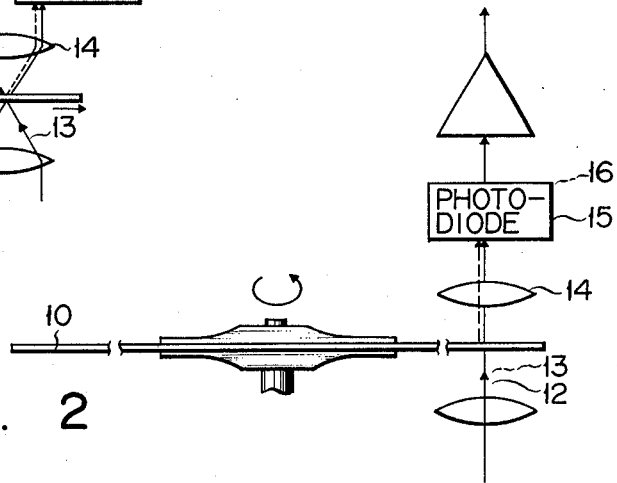

Suppose that two laser beams 12 and 13 are incident, at a crossing angle of $2\theta$ as shown in FIG. 3, to the track of the recording medium. With 12a representing a zeroth order light of one laser beam 12, 12b and 12c first order lights of the laser beam 12, and 13a a zero order light of the other laser beam 13, 13b and 13c first order diffracted lights of the laser beam 13, respectively, the above-mentioned crossing angle $2\theta$ is so selected that the zero order light 12a is superposed on the first diffracted light 13b and the zero order light 13a on the first diffracted light 12b. As shown in FIG. 3 the laser beams 12a, 12b, 12c and 13a, 13b, 13c are subjected to an optical Fourier-transform through an objective lens 14 (focal distance $f$) and then a light mixing through two diodes 15 and 16 located at a focal plane (having a coordinate axis $\nu$).

The amplitude distributions of the incident laser beams 12 and 13 on the track of the recording medium can be expressed as $a(x)e^{ik_\theta x}$ and $a(x)e^{-ik_\theta x}$, respectively, provided that a Gaussian beam with amplitude distribution $a(x)=Ae^{-(x/w)2}$ (A: constant) and a beam radius of w is under consideration ($k_\theta = 2\pi/\lambda \sin\theta$; $\lambda$: wavelength of the laser beam). As a result, the laser beams 12a, 12b, 12c and 13a, 13b, 13c which consist of the zero order lights and the diffracted lights, can be given below:

$$\psi(x) = a(x)e^{ik_\theta x} + \frac{iK}{2} a(x)e^{i(k_\theta - k_c)x} e^{i\omega_c t} e^{i\Delta\omega S(t - \frac{x}{v})} + \quad (6)$$

$$\frac{iK}{2} a(x)e^{i(k_\theta + k_c)x} e^{-i\omega_c t} e^{-i\Delta\omega S(t - \frac{x}{v})} +$$

$$a(x)e^{-ik_\theta x} + \frac{iK}{2} a(x)e^{-i(k_\theta + k_c)x} e^{i\omega_c t} e^{i\Delta\omega S(t - \frac{x}{v})} +$$

$$\frac{iK}{2} a(x)e^{-i(k_\theta - k_c)x} e^{-i\omega_c t} e^{-i\Delta\omega S(t - \frac{x}{v})}$$

The second, third, fifth and sixth time-dependent terms representing the diffracted light as shown in FIG. 3 specify the Doppler shifts.

The light amplitude distribution $\tilde\psi(\nu/\lambda f)$ at the focal plane (optical Fourier-transform plane) of the objective lens 14, i.e., at the light receiving surface of the photodiodes 15 and 16 will be expressed as follows:

$$\tilde\psi(\nu/\lambda f) = \int_{-\infty}^{+\infty} \psi(x) e^{-\frac{2\pi i}{\lambda f} \nu x} dx = \quad (7)$$

$$\tilde a(\frac{\nu - f\sin\theta}{\lambda f}) + \frac{iK}{2} e^{i\omega_c t} \int_{-\infty}^{+\infty} a(x) e^{i(k_\theta - k_c)x} \times$$

$$e^{i\Delta\omega S(t - \frac{x}{v})} e^{-\frac{2\pi i}{\lambda f} \nu x} dx +$$

$$\frac{iK}{2} e^{-i\omega_c t} \int_{-\infty}^{+\infty} a(x) e^{i(k_\theta + k_c)x} e^{-i\Delta\omega S(t - \frac{x}{v})} e^{-\frac{2\pi i}{\lambda f} \nu x} dx +$$

$$\tilde a(\frac{\nu + f\sin\theta}{\lambda f}) + \frac{iK}{2} e^{i\omega_c t} \int_{-\infty}^{+\infty} a(x) e^{-(k_\theta + k_c)x} \times$$

$$e^{i\Delta\omega S(t - \frac{x}{v})} e^{-\frac{2\pi i}{\lambda f} \nu x} dx +$$

$$\frac{iK}{2} e^{-i\omega_c t} \int_{-\infty}^{+\infty} a(x) e^{-i(k_\theta - k_c)x} e^{-i\Delta\omega S(t - \frac{x}{v})} e^{-\frac{2\pi i}{\lambda f} \nu x} dx.$$

where

-continued
$$\tilde{a}\left(\frac{\nu \mp f\sin\theta}{\lambda f}\right) = \int_{-\infty}^{+\infty} a(x)e^{\pm ik_\theta x}e^{-\frac{2\pi i}{\lambda f}\nu x}dx \qquad (8)$$

The focal plane is equally divided at a midpoint ($\nu=0$) with the right half plane surface corresponding to the photodiode 15 and the left half plane surface corresponding to the photodiode 16. The light mixing output $I_1(t)$ of the photodiode 15 will be:

$$I_1(t) = \int_0^{+\infty} |\tilde{\psi}(\nu/\lambda f)|^2 d\nu \approx \int_0^\infty |\tilde{a}\left(\frac{\nu - f\sin\theta}{\lambda f}\right)|^2 d\nu + \int_0^\infty |\tilde{a}\left(\frac{\nu + f\sin\theta}{\lambda f}\right)|^2 d\nu + \qquad (9)$$

$$2\int_0^{+\infty} \tilde{a}\left(\frac{\nu - f\sin\theta}{\lambda f}\right)\tilde{a}\left(\frac{\nu + f\sin\theta}{\lambda f}\right)d\nu +$$

$$\frac{K^2}{4}\int_0^{+\infty} |\int_{-\infty}^{+\infty} a(x)e^{i(k_\theta - k_c)x}e^{i\Delta\omega S(t - \frac{x}{\nu})}e^{-\frac{2\pi i}{\lambda f}\nu x}dx|^2 d\nu +$$

$$\frac{K^2}{4}\int_0^{+\infty} |\int_{-\infty}^{+\infty} a(x)e^{i(k_\theta + k_c)x}e^{-i\Delta\omega S(t - \frac{x}{\nu})}e^{-\frac{2\pi i}{\lambda f}\nu x}dx|^2 d\nu +$$

$$\frac{K^2}{4}\int_0^{+\infty} |\int_{-\infty}^{+\infty} a(x)e^{-i(k_\theta + k_c)x}e^{i\Delta\omega S(t - \frac{x}{\nu})}e^{-\frac{2\pi i}{\lambda f}\nu x}dx|^2 d\nu +$$

$$\frac{K^2}{4}\int_0^{+\infty} |\int_{-\infty}^{+\infty} a(x)e^{-i(k_\theta - k_c)x}e^{-i\Delta\omega S(t - \frac{x}{\nu})}e^{-\frac{2\pi i}{\lambda f}\nu x}dx|^2 d\nu +$$

$$R_e\left[\frac{iK}{2}e^{i\omega_c t}\int_0^\infty \tilde{a}\left(\frac{\nu - f\sin\theta}{\lambda f}\right)\int_{-\infty}^{+\infty} a(x)e^{i(k_\theta - k_c)x}e^{i\Delta\omega S(t - \frac{x}{\nu})}e^{-\frac{2\pi i}{\lambda f}\nu x}dx d\nu\right] +$$

$$R_e\left[\frac{iK}{2}e^{-i\omega_c t}\int_0^\infty \tilde{a}\left(\frac{\nu - f\sin\theta}{\lambda f}\right)\int_{-\infty}^{+\infty} a(x)e^{i(k_\theta + k_c)x}e^{-i\Delta\omega S(t - \frac{x}{\nu})}e^{-\frac{2\pi i}{\lambda f}\nu x}dx d\nu\right] +$$

$$R_e\left[\frac{iK}{2}e^{-i\omega_c t}\int_0^\infty \tilde{a}\left(\frac{\nu - f\sin\theta}{\lambda}\right)\int_{-\infty}^{+\infty} a(x)e^{-i(k_\theta - k_c)x}e^{-i\Delta\omega S(t - \frac{x}{\nu})}e^{-\frac{2\pi i}{\lambda f}\nu x}dx d\nu\right] +$$

$$R_e\left[\frac{iK}{2}e^{i\omega_c t}\int_0^\infty \tilde{a}\left(\frac{\nu + f\sin\theta}{\lambda f}\right)\int_{-\infty}^{+\infty} a(x)e^{i(k_\theta - k_c)x}e^{i\Delta\omega S(t - \frac{x}{\nu})}e^{-\frac{2\pi i}{\lambda f}\nu x}dx d\nu\right] +$$

$$R_e\left[\frac{iK}{2}e^{-i\omega_c t}\int_0^\infty \tilde{a}\left(\frac{\nu + f\sin\theta}{\lambda f}\right)\int_{-\infty}^{+\infty} a(x)e^{-i(k_\theta - k_c)x}e^{-i\Delta\omega S(t - \frac{x}{\nu})}e^{-\frac{2\pi i}{\lambda f}\nu x}dx d\nu\right] +$$

$$R_e\left[\frac{K^2}{4}e^{2i\omega_c t}\int_0^\infty \left(\int_{-\infty}^{+\infty} a(x)e^{i(k_\theta - k_c)x}e^{i\Delta\omega S(t - \frac{x}{\nu})}e^{-\frac{2\pi i}{\lambda f}\nu x}dx\right) \times \right.$$

$$\left.\left(\int_{-\infty}^{+\infty} a(x)e^{i(k_\theta - k_c)x}e^{i\Delta\omega S(t - \frac{x}{\nu})}e^{-\frac{2\pi i}{\lambda f}\nu x}dx\right)d\nu\right] +$$

$$R_e\left[\frac{K^2}{4}\int_0^\infty \left(\int_{-\infty}^{+\infty} a(x)e^{i(k_\theta + k_c)x}e^{-i\Delta\omega S(t - \frac{x}{\nu})}e^{-\frac{2\pi i}{\lambda f}\nu x}dx\right) \times \right.$$

$$\left.\left(\int_{-\infty}^{+\infty} a(x)e^{i(k_\theta - k_c)x}e^{i\Delta\omega S(t - \frac{x}{\nu})}e^{-\frac{2\pi i}{\lambda f}\nu x}dx\right)d\nu \div\right.$$

$$(1 + \frac{K^2}{2})\int_{-\infty}^{+\infty} a^2(x)dx + \int_{-\infty}^{+\infty} \tilde{a}\left(\frac{\nu - f\sin\theta}{\nu f}\right)\tilde{a}\left(\frac{\nu + f\sin\theta}{\lambda f}\right)d\nu +$$

$$\frac{K^2}{2}\int_{-\infty}^{+\infty} a^2(x)\cos 2k_\theta x\, dx +$$

$$\frac{K^2}{4}\int_{-\infty}^{+\infty} a^2(x)\cos\{2\omega_c t + 2(k_\theta + k_c)x + 2\Delta\omega S(t - \frac{x}{\nu})\}dx +$$

$$K\int_{-\infty}^{\infty} a^2(x)\sin\{(2k_\theta - k_c)x + \omega_c t + \Delta\omega S(t - \frac{x}{\nu})\}dx$$

If the requirement $2k_\theta = k_c$ is given for the crossing angle of the laser beams, $$I_1(t) \approx (1 + \frac{K^2}{2})\int_{-\infty}^{+\infty} a^2(x)dx + \qquad (10)$$

$$\int_{-\infty}^{+\infty} \tilde{a}\left(\frac{\nu - f\sin\theta}{\lambda f}\right)\tilde{a}\left(\frac{\nu + f\sin\theta}{\lambda f}\right)d\nu +$$

$$\frac{K^2}{2}\int_{-\infty}^{+\infty} a^2(x)\cos k_c x\, dx +$$

$$\frac{K^2}{4}\int_{-\infty}^{+\infty} a^2(x)\cos\{-k_c x + 2\omega_c t + 2\Delta\omega S(t - \frac{x}{\nu})\}dx +$$

-continued
$$K\int_{-\infty}^{+\infty} a^2(x)\sin\{\omega_c t + \Delta\omega S(t - \frac{x}{\nu})\}dx$$

Figure 4:
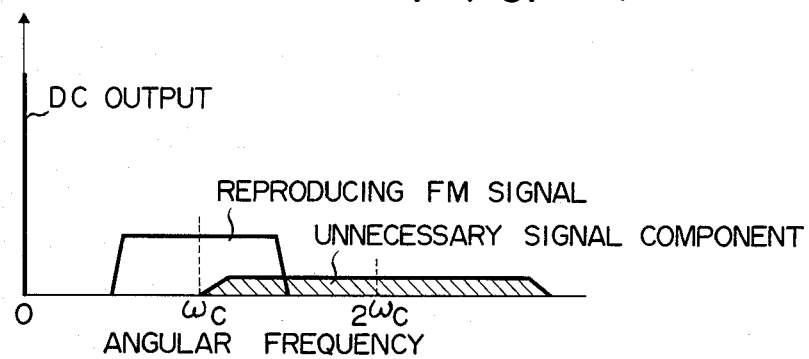
FIG. 4 shows a frequency spectrum of an optical mixing output.

The first to third terms of the equation (10) represent a DC output and the fourth term of the equation (10) represents a spurious signal component having a frequency spectrum width twice as large as that of the original FM signal. The fifth term of the equation (10) represents the reproducing output of the FM signal as sought. The reproducing output of the FM signal is obtained by effecting an optical mixing between the zero order light 12a and the diffracted light 13b and between the zero order light 13a and the diffracted light 12b. FIG. 4 pictorially shows the frequency spectrum of the light mixing output $I_1(t)$.

The output $I_2(t)$ of the photodiode 16 is also found as follows:

$$I_2(t) = \int_{-\infty}^0 |\tilde{\psi}(\nu/\lambda f)|^2 d\nu \approx \qquad (11)$$

-continued $$(1 + \frac{K^2}{2}) \int_{-\infty}^{+\infty} a^2(x)dx +$$

$$\int_{-\infty}^{+\infty} \tilde{a}(\frac{v - f\sin\theta}{\lambda f})\tilde{a}(\frac{v + f\sin\theta}{\lambda f})dv +$$

$$\frac{K^2}{2} \int_{-\infty}^{+\infty} a^2(x)\cos k_c x\, dx +$$

$$\frac{K^2}{4} \int_{-\infty}^{+\infty} a^2(x)\cos\{-k_c x + 2\omega_c t + 2\Delta\omega S(t - \frac{x}{v})\}dx -$$

$$K \int_{-\infty}^{+\infty} a^2(x)\sin\{\omega_c t + \Delta\omega S(t - \frac{x}{v})\}dx$$

Upon comparing the equations (10) and (11) it will be seen that the fifth terms representing the FM signal reproducing outputs bear an out-of-phase relation to each other. By detecting a difference between the output $I_1(t)$ and the output $I_2(t)$ it is possible to double the reproducing output of the FM signal and eliminate the DC component of the first to third terms and the spurious signal component of the fourth term. The differential output $I_d(t)$ will be given below:

$$I_d(t) = 2K \int_{-\infty}^{+\infty} a^2(x)\sin\{\omega_c t + \Delta\omega S(t - \frac{x}{v})\}dx \quad (12)$$

When in this case the beam diameter 2w of the incident laser beam pair is sufficiently small compared with a minimum recording wavelength of the signal $S(-x/v)$, $a^2(x)$ can be approximated as a delta function as shown in the following equation and a reducing output faithful to the FM signal can be provided.

$$I_d(t) \approx 2K\sin\{\omega_c t + \Delta\omega S(t)\omega \quad (13)$$

According to this invention, as mentioned above, the diameter of an incident laser beam on a signal recording track must be sufficiently small as compared with the minimum recording wavelength of the signal $S(-x/v)$ but need not to be sufficiently small as compared with the recording wavelength of the carrier. Since the minimum recording wavelength of the signal $S(-x/v)$ is usually about two times longer than the recording wavelength of the carrier, where in the conventional signal reproducing technique the laser beam diameter must be sufficiently small as compared with the recording wavelength of the carrier, it is possible to make the laser beam diameter about two times greater in this invention than in the conventional signal reproducing technique using no optical mixing method. In this invention, therefore, the focal depth of the laser beam during the signal reproducing time is increased to advantage. Furthermore, since the whole amount of the zero order light can be mixed with the diffracted light at a light receiving element to reproduce the signal, a large signal reproducing output can be obtained as compared with a signal reproducing technique using a conventional optical mixing method in which the portion of a signal light is detected through an extra-fine slit. In the conventional technique a light receiving element is positioned at the imaging point of a recording medium in a signal detecting optical system. According to this invention, however, a light receiving element is located preferably at the optical Fourier transform surface of the recording medium, i.e., at the focal plane of the objective lens and an optical path length extending from the recording medium of the signal detecting optical system to the light receiving element is made less than one half that involved in the conventional length, thus offering the advantage of making compact the signal detecting optical system and in consequence an optical readout head.

Figure 5:
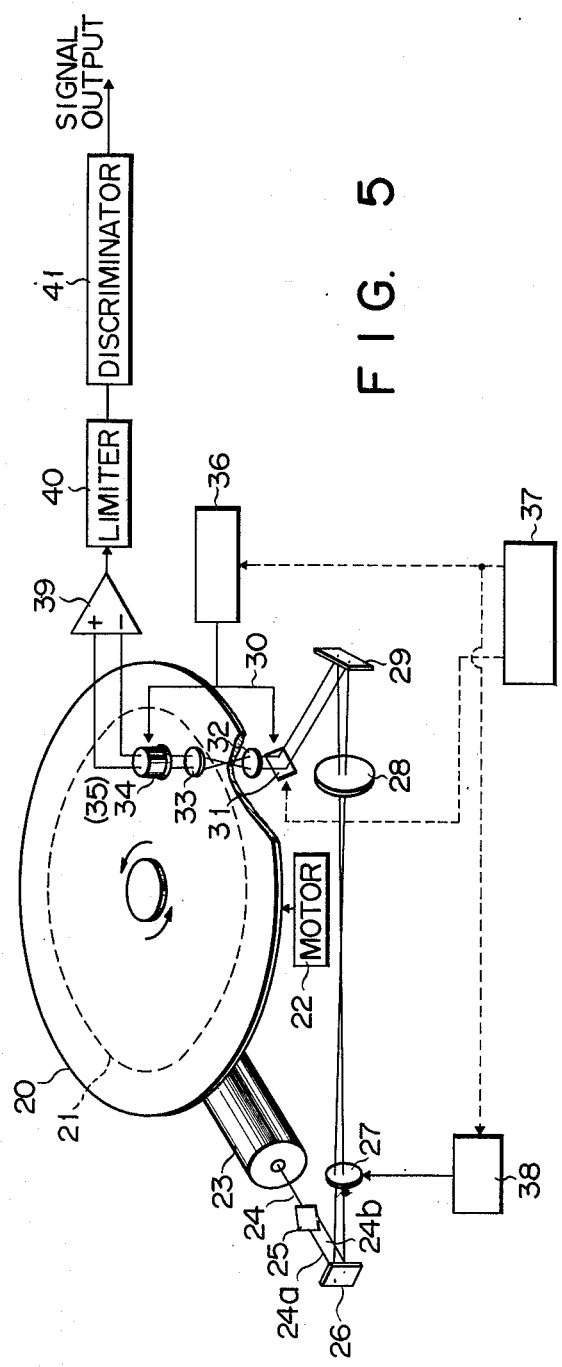
FIG. 5 schematically shows an optical reproduction apparatus according to an embodiment of the invention.

A signal reproducing apparatus according to one embodiment of this invention will be explained by referring to FIG. 5.

In the Figure, 20 is a recording medium, i.e., a 30.5 cm diameter disc comprised of a transparent glass substrate on which a chalcogenide glass such as an As-Se-S-Ge glass is sputtered. A frequency modulated signal with a waveform having a pitch of about 1 μm is recorded on a number of concentrical tracks 21 on the chalcogenide glass.

The distance between each track is 2.5 μm. In this way, recording and, if necessary, rewriting by a laser beam irradiation can be effected by a known technique. The disc recording medium is rotated by a motor 22 at a rate of 1800 rpm with a vertical axis as a center. A He-Ne gas laser 23 is used as a laser beam source. One laser beam 24 is divided at a laser beam divider 25 into two beams 24a and 24b which in turn are led to a first light path modifying mirror 26 where their optical paths are modified. The so modified laser beams 24a and 24b pass through a first condensing lens 27 and a second condensing leans 28 and arrive at a second optical path modifying mirror 29. The first and second convergent lenses 27 and 28 constitute a telescopic optical system in which a focal point and an optical axis are in alignment. The lens 27 is a zoom lens and its focal distance is variable.

The laser beams 24a and 24b having their optical paths modified by the reflecting mirror 29 are incident on an optical readout head 30 to effect a predetermined signal reproduction. The optical readout head 30 has at the lower side of the recording disc 20 a light deflecting mirror 31 swung through a piezoelectric device or a galvanometer with a horizontal axis as a center and deflecting the laser beams 24a and 24b from the reflecting mirror 29 in the radial direction of the recording medium 20, and a short focal distance convex lens 32 which permits the beams 24a and 24b from the deflecting mirror 31 to be incident at a predetermined angle on the track of the recording medium so that they are focussed. The optical readout head 30 further includes a short focal distance condensing lens 33 disposed above the disc 20 and receiving a pair of superposed lights comprised of a zero order light and diffracted light as passed through the signal recording track, and a pair of photodiodes 34, 35 located at the focal plane of the lens 33 so as to receive the pair of superposed lights converged through the lens 33.

The optical readout head 30 including the various members 31 to 35 can horizontally move in the radial direction of the disc 20 by a positioner 36, comprised of a linear motor mechanism, such as a magnetic head positioner of a known magnetic disc device and access the tracks on the disc 20. In FIG. 5, 37 is a track access control mechanism adapted to control the positioner 36 and light deflecting mirror 31 to cause the laser beam pair condensed by the convex lens 32 on the recording surface of the disc to be selectively incident on the desired track on the disc. The zoom lens 27 in the telescope optical system has its focal distance adjusted by a drive mechanism 38 so as to permit the distance between the laser beams 24a and 24b as well as the diameter of the laser beam to be adjusted. The recording wavelength $2\pi v/\omega_c$ of a carrier varies according to the position of a track, since for a different track position, i.e., for a different radius of the track the tangential speed v varies with the radius of the track. For this reason, address data of the track to be accessed is fed from the track access control device 37 to the zoom lens drive mechanism 38 to cause the zoom lens 27 to be mechanically controlled to permit the focal distance of the zoom lens to be set to a proper value, causing the magnification of the telescope optical system to be adjusted to a proper value and adjusting the distance between the laser beams 24a and 24b as well as the diameter of the beam with the result that for each track the crossing angle 2θ of the laser beam pair on the track of the disc is adjusted to be $2k_\theta = k_c$, i.e., $2\sin\theta = \lambda\omega_c/2\pi v$. As the zoom lens mechanism and its control mechanism, use can be made of ones usually used in the camera and TV camera fields. The two superposed lights received at the two photodidodes 34 and 35 are converted at the photodiodes 34 and 25 to beat signals which in turn are supplied to a differential amplifier 39 where a difference between the two signals is generated. The difference signal is supplied to a limiter 40 where the signal amplitude is made at a predetermined level. Then, the output signal of the limiter 40 is discriminated at a discriminator to obtain a reproducing output signal.

Figure 6:
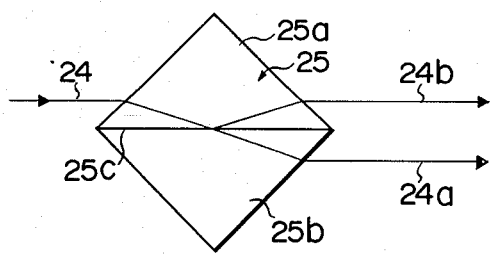
FIG. 6 is an upside view of a laser beam splitter used in the apparatus shown in FIG. 5.
Figure 7:
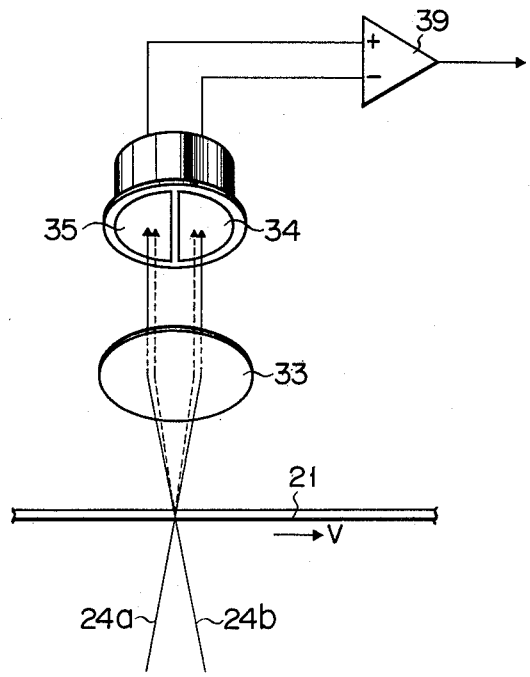
FIG. 7 shows a light detecting means of the apparatus shown in FIG. 5.

As the laser beam divider 25 use can be made of various types, but in the described embodiment a laser beam divider 25 as shown in FIG. 6 is used. The divider 25 is formed by disposing a half mirror 25c, comprised of a Ag- or Al-evaporated film, between the bottom surfaces of a pair of 45° prisms. The laser beam from the source is, when being incident to one of the 45° prisms in a direction parallel to the bottom surface of the prism, refracted and directed to the half mirror 25c where the laser beam is half reflected and half transmitted. The reflected beam 24b is passed through the prism 25a toward the outside and the transmitted beam 24a is passed through the other prism 25b toward the outside. In consequence, one laser beam 24 is so divided into the two laser beams 24a and 24b parallel to each other. As the other laser beam divider, use can be made of, for example, a half mirror and diffraction grating. In the case of the diffraction grating, a laser beam pair is obtained by, for example, a diffracted light and an undiffracted light (in the case of a transmission type diffraction grating, a zero order transmission light and in the case of a reflection type diffraction grating, a specular reflection light). If use is made of a holographic diffraction grating, including two kinds of diffraction gratings with a different pitch, as manufactured by a holographic technique, it is possible to obtain two first order diffraction lights having a different diffraction angle. These two first order diffraction lights can be used as a laser beam pair. Since the function of the photodiodes 34 and 35 of the optical readout head 30 has been earlier explained, further explanation is omitted. The construction of the photodiodes 34 and 35 is as shown in FIG. 7.

Figure 8:
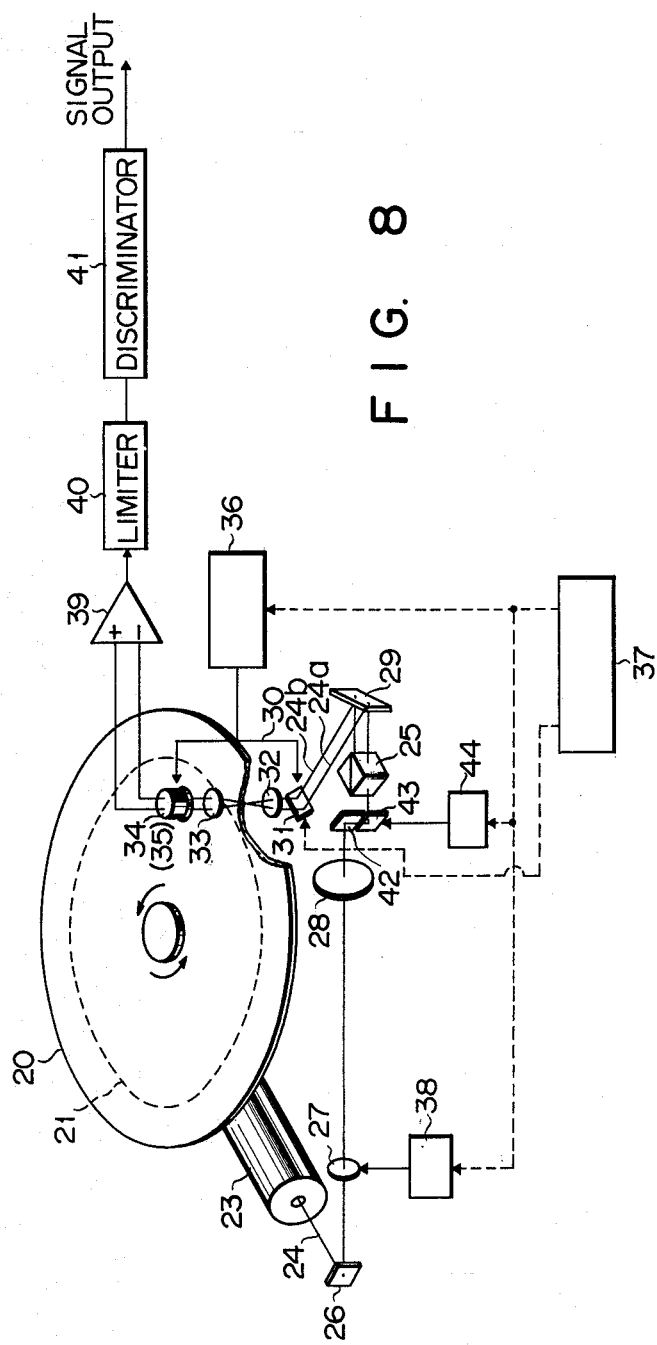
FIG. 8 schematically shows the optical reproduction apparatus according to another embodiment of the invention.

FIG. 8 shows another optical reproducing apparatus accoring to another embodiment of this invention. The same reference numerals are employed in this embodiment to designate parts or elements corresponding to those used in the first embodiment and further explanation is therefore omitted.

In the embodiment in FIG. 8 the diameter of a laser beam is adjusted by a zoom lens 27 and a distance between a pair of laser beams is adjusted by a fixed mirror 42, movable mirror 43 and beam divider 25. Since in this embodiment the divider 25 is not disposed between a laser source 23 and a first optical path modifying mirror 26, a laser beam is divided into two after passage through a telescope optics system. Reference numeral 44 is a movable mirror drive device adapted to receive a track address data through a track access control device 37 and move the movable mirror 43 according to the address data.

As shown in FIG. 9 a beam separation control unit includes a fixed mirror 42 for reflecting an incident beam 24 at right angles and a movable mirror 43 for reflecting the reflected beam at right angles toward a divider 25 and adjusts a distance between a pair of beams 24a, 24b by moving the movable mirror 43 to the incident beam as shown by arrows.

FIG. 10 shows a reproducing apparatus according to this invention, in which a diffraction grating plate is used as a beam divider. The same reference numerals are employed in this embodiment to designate parts, and elements corresponding to those shown in FIG. 5.

A diffraction grating plate 25' is arranged between a zoom lens 27 and a fixed lens 28 and adapted to divide into two beams 24a and 24b a laser beam 24 having its diameter adjusted by the zoom lens 27 and conduct the beams 24a and 24b to a fixed lens 28. The diffraction grating plate 25' has a number of diffraction gratings, slightly different in their grating pitch, arranged in a line and it is horizontally moved through a drive device 45 according to the address data of the track to permit a diffraction grating with a desired grating pitch to come to a laser beam incident position, thereby controlling a diffraction angle and setting to a desired value an incident cross angle to a recording medium of a pair of laser beams 24a, 24b generated through the diffraction grating.

As in the above-mentioned respective embodiments a signal is recorded, as a phase change resulting from the change of a refractive index, the unevenness of the recording medium and so on, on the recording medium, the plane of polarization of the incident beam is not rotated. If, however, a magnetic thin film is used as a magnetic recording medium, i.e., a reproducing is effected through a recording medium in which a signal is recorded as a phase grating in the form of a magnetization pattern, the recording medium has the function of rotating the plane of polarization of the first diffracted light through an angle of 90° and, as a result, the zero order light and diffracted light have planes of polarization which are orthogonal to each other. Such a phenomenon is disclosed in an article, H. M. Haskal, "Polarization and Efficiency in Magnetic Holography," IEEE Transaction on Magnetics, Volume Mag-6, No. 3, pp. 542 to 545, Sep. 1970.

The reproducing apparatus according to this invention permits an optical mixing between a zero order light of one of a pair of laser beams converged toward the recording medium and a diffracted light of the other laser beam, and the senses of both the planes of polarization of the beams must be coincident with each other. If, therefore, a thin magnetic film is used as a magnetic film, the paired laser beams incident to the recording medium must have their planes of polarization crossing at right angles to each other. For this reason, a calcite crystal as shown in FIG. 11 may be used as a beam divider to permit the planes of polarization of the paired beams to intersect at right angles. The function of the calcite crystal is known, for example, in an article, F. A. Jenkins and H. E. White, "Fundamentals of Optics," McGraw Hill Book Co., New York, 1957, p499. In FIG. 11, 25" shows a calcite crystal; 24, an incident laser beam whose plane of polarization is inclined at an angle of 45° to the drawing sheet; 24a, a vertically polarized light (ordinary ray); and 24b, a horizontally polarized light (an extraordinary ray). The Rochon prism and Wollaston prism perform the same function.

In the above-mentioned respective embodiments the recording mediums are all of a light transmission type. Although explanation has been made of the optical mixing between the first order diffracted light and the zero order transmitted light, the same thing holds true for the reflection type recording medium. That is, the zero order transmitted light from the transmissive recording medium corresponds to a specular reflective light from a reflective recording medium, and the specular reflection light of one of a pair of incident laser beams is superposed on the first order diffracted light of the other and an optical mixing is effected on a light receiving element. A difference between the tansmission type recording medium and the reflection type recording medium is merely a difference resulting from the form of an optical system particularly an optical head. In the case of the transmission type, the superposed readout laser beam comprised of an undiffracted light and the first order diffracted light is formed in a direction the same as that of the incident laser beam and in the case of the reflection type, the superposed readout laser beam is formed in a direction opposite to that of the incident laser beam. For this reason, the optical head has a somewhat different structure.

FIGS. 12A and 12B show the case where a magnetic thin film such as a Mn-Bi film and Gd-Co film is used as a recording medium. FIGS. 12A and 12B show a transmission type signal reproduction using the Faraday effect and a reflection type signal reproduction using the Kerr effect respectively. Since for the magnetic thin film as mentioned above the plane of polarization of the incident laser beams 24a and 24b and non-diffracted beams 12a and 13a cross at right angles to that of the first order diffraction lights 12b and 13b, it is necessary to use a pair of laser beams 24a, 24b whose planes of polarization cross at right angles. In FIGS. 12A and 12B, the laser beams whose planes of polarization intersect at right angles are indicated by signs "−" and "+".

Figure 13:
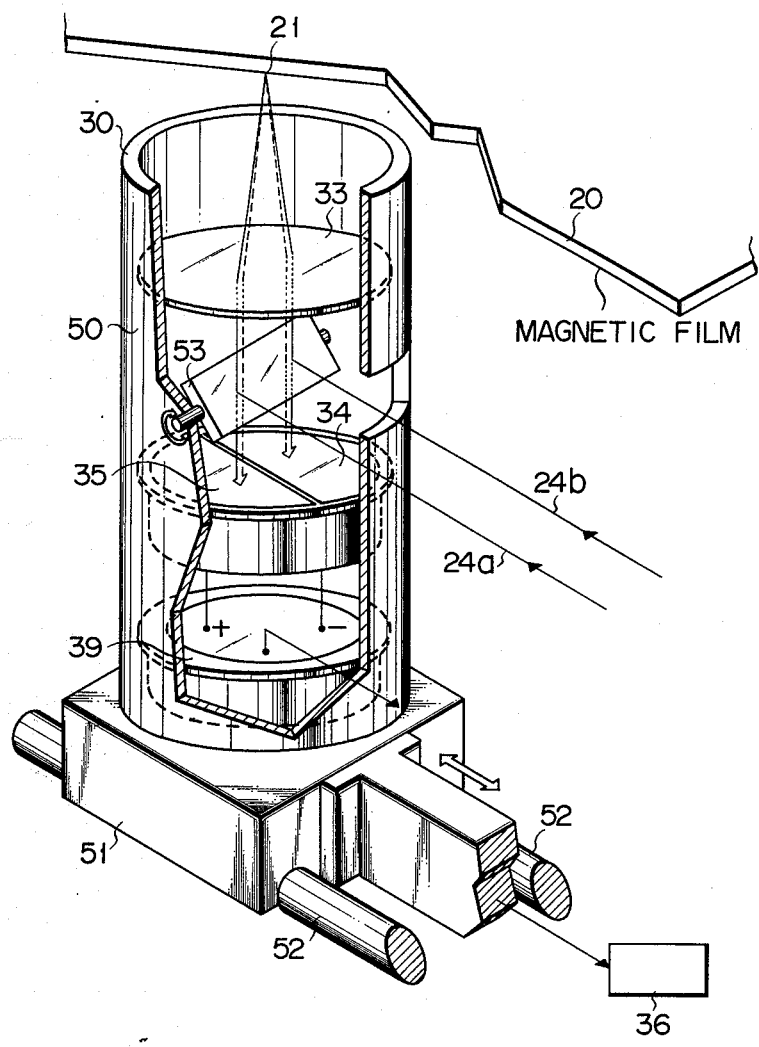
FIG. 13 is a perspective view, partly cut away, of an example of an optical head for use in the optical reproduction apparatus.

FIG. 13 schematically shows one example of an optical head when a reflection type recording medium is used. Except for the optical head, the other optical system and reproducing circuit as disclosed in this invention can be used in the similar way. In this arrangement, use is made of a recording medium 20 comprised of a disc-like non-transparent substrate coated with a magnetic thin film, and a signal recording track 21 is formed on the undersurface of the recording medium 20. An optical head 30 is disposed below the recording medium 20 and it is mounted on a carrier 51. The carrier 51 can be slidably moved along rails 52 which extend in the radial direction of the disc-like recording medium. The carrier 51 is moved by a positioner along the rails 52. The optical head 30 includes a converging leans 33 arranged at the upper portion of a cylinder 50, a half mirror 53 swingably mounted below the converging lens 33 and a pair of photodiodes 34 and 35. In the Figure, 39 is an IC differential amplifier.

In the optical head 30 a pair of incident beams 24a, 24b are incident to the half mirror 53 where they are directed upwardly and converged through the converging lens 33 toward the recording truck 21. As a result, the beams 24a and 24b are reflected and at the same time diffracted at the recording track 21. The reflected and diffracted beams are transmitted backward through the lens 33 and the half mirror 53 and sensed at the photodiodes 34 and 35 and a reproducing signal is obtained in a similar way. Note that the half mirror 53 is minutely swung by a piezoelectric element or a galvanometer.

Although in the above-mentioned embodiments a rotatary disc is used as a recording medium, a recording section such as a moving tape may be moved and scanned. The shape and the manner of movement are not restricted in this invention.

What we claim is:

1. Apparatus for reproducing electric signals recorded in a moving recording medium of low diffraction capability as optical phase changes by the use of a carrier modulation method, comprising:
   a laser light source for emitting a laser beam;
   dividing means for dividing said laser beam into a pair of spaced apart laser beams;
   condensing means for condensing said pair of spaced apart laser beams onto a recording medium so that said pair of laser beams are incident on said recording medium at substantially the same point and so that non-diffracted light of one of said laser beams is passed through the center of the diffracted light of the other of said laser beams, the light of said other laser beam being diffracted by said signal recording medium; and
   reproducing means including a pair of photodetectors for receiving respectively a pair of overlapped light beams from said recording medium, each pair of overlapped light beams including a beam of light diffracted by said signal recording medium and a beam of non-diffracted light to produce a beat signal between said diffracted and non-diffracted light beams; and a differential amplifier coupled to said photodetectors for subjecting the beat signals from said photodetectors to differential amplification, thereby reproducing at the output of the differential amplifier a modulated signal from said beat signals.

2. Apparatus according to claim 1, wherein said recording medium is transparent and transmits the incident laser beam pair; and said condensing means and said reproducing means are provided on respective opposite sides of said recording medium.

3. Apparatus according to claim 1, wherein said recording medium includes a nontransparent body which reflects the incident laser beam pair; and said condensing means and said reproducing means are provided at one side of said recording medium.

4. Apparatus according to claim 1, wherein said recording medium includes a rotating substrate and an As-Se-(S)-Ge chalcogenide glass layer on said substrate to record signals optically.

5. Apparatus according to claim 4, which further comprises a telescope optical system having a stationary converging member and a focal length-variable converging member, and provided between said laser light beam and said condensing means.

6. Apparatus according to claim 5, wherein said dividing means includes a pair of rectangular equilateral prisms whose bottom surfaces are disposed in facing relation to each other; and a semi-transparent mirror, located between said bottom surfaces of said prisms.

7. Apparatus according to claim 6, which further comprises a stationary reflector for reflecting the laser beam from said laser light source at an angle of 90° and a movable reflector for reflecting the laser beam reflected from said stationary reflector at an angle of 90° to guide said laser beam to said dividing means.

8. Apparatus according to claim 5, wherein said dividing means includes a diffraction grating plate interposed between said stationary converging member and said focal length-variable converging member of said telescope optical system, the diffraction grating plate having a plurality of diffraction gratings of different pitches arranged in a row and movable along said row.

9. Apparatus according to claim 1, wherein said recording medium includes a rotating substrate and a magnetic film on said substrate to record signals magnetically; and said dividing means includes a dividing member for dividing the incident laser beam into a pair of laser beams whose planes of polarization intersect at right angles to each other.

10. Apparatus according to claim 9, wherein said dividing member comprises a calcite crystal.

11. Apparatus according to claim 9, wherein said dividing member comprises a Rochon prism.

12. Apparatus according to claim 9, wherein said dividing member comprises a Wollaston prism.

13. Apparatus according to claim 1, which further comprises a movable optical head provided with said condensing means and said reproducing means.

14. Apparatus according to claim 1, wherein said pair of photodetectors comprise a pair of photodiodes.

* * * * *